United States Patent
Baudia

(10) Patent No.: US 10,324,196 B2
(45) Date of Patent: Jun. 18, 2019

(54) LOCATION DETERMINATION METHOD AND SYSTEM

(71) Applicant: Geomoby Pty Ltd, Scarborough, Western Australia (AU)

(72) Inventor: Christophe Baudia, Scarborough (AU)

(73) Assignee: Geomoby Pty Ltd, Scarborough, Western Australia (AU)

( * ) Notice: Subject to any disclaimer, the term of this patent is extended or adjusted under 35 U.S.C. 154(b) by 664 days.

(21) Appl. No.: 14/904,687

(22) PCT Filed: Jul. 19, 2014

(86) PCT No.: PCT/AU2014/000739
§ 371 (c)(1),
(2) Date: Jan. 12, 2016

(87) PCT Pub. No.: WO2015/006819
PCT Pub. Date: Jan. 22, 2015

(65) Prior Publication Data
US 2016/0154117 A1 Jun. 2, 2016

(30) Foreign Application Priority Data

Jul. 19, 2013 (AU) .............................. 2013902703

(51) Int. Cl.
*G01S 19/48* (2010.01)
*G01S 19/34* (2010.01)
(Continued)

(52) U.S. Cl.
CPC ............ *G01S 19/48* (2013.01); *G01S 5/0027* (2013.01); *G01S 5/0263* (2013.01); *G01S 19/34* (2013.01);
(Continued)

(58) Field of Classification Search
CPC ....... H04W 4/02; H04W 4/021; H04W 4/023; H04W 4/025; H04W 4/029; H04W 4/04; H04W 4/20; H04W 48/16
See application file for complete search history.

(56) References Cited

U.S. PATENT DOCUMENTS 7,162,327 B1 * 1/2007 Crozier .................. E01B 29/06
700/213
2007/0103363 A1 * 5/2007 Boiero .................... G01S 19/50
342/357.29
(Continued)

FOREIGN PATENT DOCUMENTS

JP 2005309513 A 11/2005
JP 2008526146 A 7/2008
(Continued)

*Primary Examiner* — Jean A Gelin
(74) *Attorney, Agent, or Firm* — patenttm.us

(57) ABSTRACT

There is a method of and a system for determining a location of a mobile device having both a module that is part of a terrestrial-based location system and a module that is part of a satellite-based global positioning system. The system comprises a remote system. The mobile device is configured to activate one of the location determining modules of the mobile device, where the type of either location determining module activated is selected according to a location module type datum in a message received by the mobile device from the remote system. The mobile device establishes a connection between the mobile device and the remote system and the remote system receives the determined location. A type of location determining module to be next used by the mobile device is determined or a period of time before the module device next determines it location is determined. A message is send from the remote system to the mobile device. The message comprises the determined type of location determining module to be next used by the mobile
(Continued)

device and or the period of time before the module device next determines it location is determined.

33 Claims, 7 Drawing Sheets

(51) Int. Cl.
G01S 5/00 (2006.01)
G01S 5/02 (2010.01)
H04W 52/02 (2009.01)

(52) U.S. Cl.
CPC ....... *G01S 5/0018* (2013.01); *H04W 52/0209* (2013.01); *Y02D 70/1222* (2018.01); *Y02D 70/142* (2018.01); *Y02D 70/144* (2018.01); *Y02D 70/164* (2018.01); *Y02D 70/166* (2018.01); *Y02D 70/26* (2018.01)

(56) References Cited

U.S. PATENT DOCUMENTS

| | | |
|---|---|---|
| 2009/0278738 A1 | 11/2009 | Gopinath |
| 2011/0054780 A1 | 3/2011 | Dhanani et al. |
| 2011/0269476 A1* | 11/2011 | Kumar ............... H04W 48/18 455/456.1 |
| 2012/0101726 A1 | 4/2012 | Ghosh et al. |
| 2015/0019122 A1* | 1/2015 | Wang ............... G09B 29/007 701/409 |

FOREIGN PATENT DOCUMENTS

| | | |
|---|---|---|
| JP | 2011252721 A | 12/2011 |
| JP | 2012029053 A | 2/2012 |
| JP | 2012235480 A | 11/2012 |
| WO | 2006/069597 A1 | 7/2006 |

\* cited by examiner

LOCATION DETERMINATION METHOD AND SYSTEM

FIELD OF THE INVENTION

The present invention relates to a location determination method usable for sustained location tracking of a mobile device.

BACKGROUND

Location-aware software applications are becoming of interest to deliver online content to users based on their physical location, as determined by their mobile device. Such mobile devices include, but are not limited to 'smart' mobile telephones and tablets. Various location determining technologies can be employed to determine the location of the mobile device and thus the user. These include satellite-based global positioning systems (GPS), cellular telephone infrastructure localisation systems (such as GSM localisation), or wireless access point positioning systems (WiFi-based positioning) to identify where mobile devices are. Localised beacon based technologies and other wireless technologies are also being employed.

Location awareness has many practical applications. One of particular interest is in sending targeted messages to the user based on their location as determined by the mobile device. In addition to the marketing opportunity for retailers, they also provide increased social connectivity and enhanced environmental awareness, offering users a location-based filter for online information.

Currently, when a location-aware application is running, it constantly transmits data and is constantly retrieving location information, usually with maximum accuracy from the GPS. When this occurs over a sustained period, the data transmission amounts to a significant portion of the data transfer of the device and also results in a significant battery drain. Location-tracking applications are notorious for blowing out data allowances and for draining batteries. This may account for why location-aware applications have not received wider adoption.

The present invention has been developed in the light of this background.

In this specification the terms "comprising" or "comprises" are used inclusively and not exclusively or exhaustively.

Any references to documents that are made in this specification are not intended to be an admission that the information contained in those documents form part of the common general knowledge known to a person skilled in the field of the invention, unless explicitly stated as such.

SUMMARY OF THE PRESENT INVENTION

According to the present invention there is provided a method of determining a location of a mobile device having both a module that is part of a terrestrial-based location system and a module that is part of a satellite-based global positioning system, said method comprising:
(i) determining the location of the mobile device using one or more of the location determining modules;
(ii) establishing a connection between the mobile device and a remote system;
(iii) transmitting the determined location to the remove system over the established connection;
(iv) determining a period of time for waiting before again determining the location of the mobile device;
(v) waiting the determined period of time; and
(vi) determining the location of the mobile device after the waited period of time has elapsed.

In an embodiment the process repeats from step (ii).

In an embodiment the method comprises receiving a message from the remote system via a messaging service, the message comprising a time period datum that represents the determined time period before again determining the location of the mobile device.

In an embodiment the time period before again determining the location of the mobile device is determined by the remote system according to a set of criteria.

In an alternative embodiment the time period before again determining the location of the mobile device is determined by the mobile device according to a set of criteria.

In an embodiment the activated location determining module calculates an accuracy value of the determined location.

In an embodiment the transmission to the remote system includes the accuracy value.

In an embodiment the transmission to the remote system includes an indication of the speed and direction of movement of the mobile device. In an embodiment the transmission to the remote system includes an indication of the altitude.

In an embodiment the criteria for determining the time period before again determining the location of the mobile device comprise one or more of the following:
i) Use a longer time period when the battery level of the mobile device is below a first specified amount;
ii) Use a longer time period when the time of day is within a specified period;
iii) Use a longer time period when the mobile device has a speed of movement less than a second specified amount;
iv) Use a longer time period when the mobile device has a speed of movement more than a third specified amount;
v) Use a longer time period when the accuracy of the last determination is better than a fourth specified amount;
vi) Use a shorter time period when the battery level of the mobile device is above the first specified amount;
vii) Use a shorter time period when the time of day is outside the specified period;
viii) Use a shorter time period when the mobile device has a speed of movement between the second specified amount and the third specified amount;
ix) Use a shorter time period when the accuracy of the last determination is worse than a fifth specified amount;
x) The time period may be varied according to altitude of the mobile device;
xi) Use a longer time period when a location sensitive application is running in the background of the mobile device.

In an embodiment the location determining module used to determine the location is selectable.

In an alternative embodiment the mobile device selects the type of location determining module to be used to determine the location.

In an embodiment the message received from the remote system comprises a datum indicative a selected type of location determining module to be next used to determine the location.

In an embodiment the selected types of location determining module is selected according to the accuracy of the last location determination.

In an embodiment the location determining module is only activated after the wait period has elapsed.

In an alternative embodiment the location determining modules are deactivated after a second period of time has elapsed from the time at which the location determination module is activated.

In an embodiment the second time period is based on factors determined by the mobile device.

In an embodiment the second time period is a predetermined value according to the type of activated location determining module.

In an embodiment the second time period is received in the message received from the remote system.

In an embodiment the second time period is based on a location determining time calculated by the remote system, wherein the remote system sends a datum indicative of the location determining time in the received message from the remote system.

In an embodiment the factors comprise the battery level, the accuracy of the last determined location, the direction and speed of movement of the mobile device, the proximity to an area of interest, and altitude.

In an embodiment a background service in the mobile device causes activation of the location determining module at the end of the wait period and deactivates the location determining module at the end of the location determining time period.

In an embodiment the connection to the remote system is terminated once the transmission is complete.

In an embodiment where the selected location determining module is a terrestrial location determining module and it is unable to determine the location of the mobile device within the second time period, the satellite-based location determining module is activated, the location of the mobile device is determined using the satellite-based location determining module; and the satellite-based location determining module is deactivated after a further second time period.

In an embodiment the terrestrial positioning system comprises one or more of a GSM localisation system, a WiFi-based positioning system and a localised beacon system.

In an embodiment the connection to the remote system uses a simple data interchange structure to transmit information to the remote system.

In an embodiment the connection to the remote system uses a binary data web service protocol.

In an embodiment the message received from the remote system is via a cloud messaging service.

Also according to the present invention there is provided a method of determining a location of a mobile device having both a module that is part of a terrestrial-based location system and a module that is part of a satellite-based global positioning system, said method comprising:
(i) establishing a connection between the mobile device and a remote system;
(ii) receiving a determined location from the mobile device over the established connection;
(iii) determining a type of location determining module to be used by the mobile device in the next location determination;
(iv) sending a message from the remote system to the mobile device, the message comprising a location module type datum representing the determined type of location determining module to be next used by the mobile device.

In an embodiment the remote system waits until the mobile device next establishes a connection to the remote system and then repeats from step (ii).

In an embodiment the connection established between the mobile device and a remote system is initiated by the mobile device.

In an embodiment the method further comprises calculating a time period before a further location determination is to be made by the mobile device and sending in the message from the remote system to the mobile device a time period datum representing the calculated time period before after which the determined type of location determining module is to be next used by the mobile device.

In an embodiment the method further comprise comparing the most recently received location with a previously received location and determining whether to accept the most recently received location.

In an embodiment the received location includes a measure of the accuracy of the determination of the location of the mobile device.

In an embodiment determining whether to accept the most recently received location comprises determining whether the accuracy measure meets a threshold.

In an embodiment the threshold is determined based on a determined speed and direction of movement of the mobile device.

In an embodiment the time period before a further location determination is to be made is calculated based on one or more of the following: the current mobile device location, a proximity of the mobile device to a location of interest, a direction of travel of the mobile device relative to the location of interest, speed of travel of the mobile device and an accuracy measure of the received location.

According to the present invention there is provided method of determining a location of a mobile device having both a module that is part of a terrestrial-based location system and a module that is part of a satellite-based global positioning system, said method comprising:
(i) determining the location of the mobile device using one or more of the location determining modules;
(ii) establishing a connection between the mobile device and a remote system;
(iii) transmitting the determined location to the remove system over the established connection;
(iv) selecting the type of location determining module to be next used to determine the location of the mobile device; and
(vi) determining the location of the mobile device using the selected location determining module.

In an embodiment a message received from the remote system comprises a datum indicative the selected type of location determining module to be next used to determine the location.

According to the present invention there is provided method of determining a location of a mobile device having both a module that is part of a terrestrial-based location system and a module that is part of a satellite-based global positioning system, said method comprising:
(ii) establishing a connection between the mobile device and a remote system;
(iii) receiving a determined location from the mobile device over the established connection;
(iv) selecting the type of location determining module to be next used to determine the location of the mobile device; and
(vi) sending a message to the mobile device from the remote system, where the message comprises a datum indicative the selected type of location determining module to be next used to determine the location of the mobile device.

According to another aspect of the invention there is provided a method of determining a location of a mobile device having both a module that is part of a terrestrial-based location system and a module that is part of a satellite-based global positioning system, said method comprising:

(i) activating one of the location determining modules of the mobile device, where the type of either location determining module activated is selectable according to a location module type datum in a message received by the mobile device from a remote system;

(ii) determining the location of the mobile device using the activated location determining module;

(iii) deactivating the activated location determining module after a first period of time determined by a first time period datum;

(iv) establishing a connection between the mobile device and a remote system;

(v) transmitting the determined location to the remove system over the established connection;

(vii) determining a type of location determining module to be used by the mobile device in the further location determination;

(viii) sending a message from the remote system to the mobile device the message comprising a location module type datum representing the determined type of location determining module to be next used by the mobile device.

In an embodiment the method further comprises calculating a time period before a further location determination is to be made by the mobile device; and sending in the message from the remote system to the mobile device a time period datum representing the calculated time period; and waiting a second period of time according to the received second time period datum before again activating the selected location determining modules of the mobile device.

According to the present invention there is provided system configured to determine a location of a mobile device having both a module that is part of a terrestrial-based location system and a module that is part of a satellite-based global positioning system, said system comprising:

a processor for fetching the location of the mobile device using one or more of the location determining modules;

a data transceiver for establishing a connection between the mobile device and a remote system and transmitting the determined location to the remove system over the established connection, the data transceiver being configured to terminate the connection when the transmission is sent;

a processor for determining a period of time for waiting before again determining the location of the mobile device; and a timer for signalling when the determined period of time has elapsed;

wherein one or more of the modules is configured to determine the location of the mobile device after the waited period of time is signalled to have elapsed.

In an embodiment the data transceiver is configured to receive a message from the remote system via a messaging service, the message comprising a time period datum that represents the determined time period before again determining the location of the mobile device.

In an embodiment the remote system is configured to determine the time period before again determining the location of the mobile device.

In an alternative embodiment the mobile device is configured to determine time period before again determining the location of the mobile device.

In an embodiment the remote system is configured to select the type of location determining module to be next used to determine the location.

In an embodiment the data transceiver is configured to receive from the remote system a datum indicative a selected type of location determining module to be next used to determine the location.

In an alternative embodiment the mobile device is configured to select the type of location determining module to be next used to determine the location.

In an embodiment the data transceiver is configured to include an accuracy value of the determined location in the transmission to the remote system.

In an embodiment the data transceiver is configured to include an indication of the speed and direction of movement of the mobile device in the transmission to the remote system.

In an embodiment the a processor for determining a period of time is configured to increase the waiting period of time before again determining the location of the mobile device according to one or more parameters. In an embodiment the parameters comprise the battery level of the mobile device, a time of day parameter and a lack of motion parameter.

In an embodiment the location determining module is configured to be activated for a second time period and is also configured to be deactivated after the second time period.

In an embodiment the mobile device is configured to determine the second time period.

In an embodiment the mobile device determined the second time period based on a location determining time calculated by the remote system, wherein the remote system sends a datum indicative of the location determining time in the received message from the remote system.

In an embodiment the mobile device determined the second time period based the type of activated location determining module.

In an embodiment the transceiver is configured to receive the message from the remote system is via a cloud messaging service.

Also according to the present invention there is provided a system for determining a location of a mobile device having both a module that is part of a terrestrial-based location system and a module that is part of a satellite-based global positioning system, said system comprising:

a receiver for receiving a connection from the mobile device at a remote system and for receiving a determined location from the mobile device over the established connection;

a processor for determining a type of location determining module to be used by the mobile device in the further location determination;

a transmitter for sending a message from the remote system to the mobile device the message comprising a location module type datum representing the determined type of location determining module to be next used by the mobile device.

In an embodiment the processor is configured to calculate a time period before a further location determination is to be made by the mobile device and the transmitter is configured to send in the message from the remote system to the mobile device a time period datum representing the calculated time period before after which the determined type of location determining module is to be next used by the mobile device.

In an embodiment the processor is configured to compare the most recently received location with a previously received location and determine whether to accept the most recently received location.

In an embodiment the processor is configured to determine whether to accept the most recently received location by determining whether the accuracy measure of the determination of the location of the mobile device received with the location meets a threshold.

In an embodiment the processor is configured to calculate the threshold based on a determined speed and direction of movement of the mobile device.

In an embodiment the processor is configured to calculate the time period before a further location determination is to be made is calculated based on one or more of the following: the current mobile device location, a proximity of the mobile device to a location of interest, a direction of travel of the mobile device relative to the location of interest, speed of travel of the mobile device and an accuracy measure of the received location.

According to another aspect of the invention there is provided a system of determining a location of a mobile device having both a module that is part of a terrestrial-based location system and a module that is part of a satellite-based global positioning system, said system comprising:

a remote system;

a processor in the mobile device for activating one of the location determining modules of the mobile device, where the type of either location determining module activated is selected according to a location module type datum in a message received by the mobile device from the remote system;

a transmitter in the mobile device for establishing a connection between the mobile device and a remote system;

a receiver in the remote system for receiving the determined location to the remove system over the established connection;

a processor for determining a type of location determining module to be used by the mobile device in the further location determination;

a receiver in the mobile device receiving a message from the remote system, the message comprising a location module type datum representing the determined type of location determining module to be next used by the mobile device.

In an embodiment the processor is configured to calculating a time period before a further location determination is to be made by the mobile device;

the remote system is configured to send in the message from the remote system to the mobile device a time period datum representing the calculated time period; and the mobile device is configured to wait a second period of time according to the received second time period datum before again activating the selected location determining modules of the mobile device.

According to the present invention there is provided a computer program comprising computer executable instructions stored in a non-transient manner for controlling a processor of a mobile device to perform the first mentioned method defined above.

According to the present invention there is provided a computer program comprising computer executable instructions stored in a non-transient manner for controlling a processor of a remote system to perform the second mentioned method defined above.

DESCRIPTION OF DRAWINGS

Embodiments of the present invention will now be described, by way of example only, with reference to the accompanying drawings, in which.

DETAILED DESCRIPTION OF EMBODIMENTS OF THE INVENTION

In general terms, an embodiment of the invention limits the use of location determining modules of the mobile device by activating it/them for a required amount of time before deactivating it/them, and determines an amount of time to wait before reactivation.

Also in general terms an embodiment of the invention uses GPS, which is the highest power consuming mode of location determination, only when needed.

Also in general terms, an embodiment of the invention reduces data traffic by reporting each determined location with reduced frequency due to the wait periods between each location determination.

Also in general terms, an embodiment of the invention high battery consumption processes and calculations are made on the server side.

Figure 1:
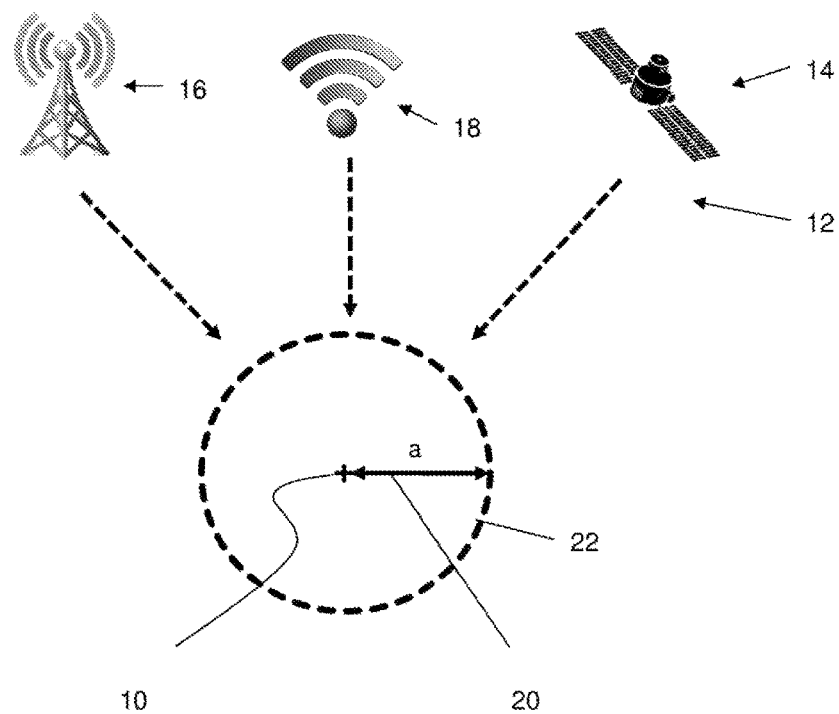
FIG. 1 is a schematic diagram of a known mobile device location system using three known location systems.

Referring to FIG. 1 there is shown a schematic representation of a mobile device 10 using three example location determining systems 12 to determine the location of the mobile device 10, and an accuracy radius 20 defining an possible location zone 22 that indicates where the device might actually be located with a degree of confidence in relation to the determined location. The location determining systems 12 include a satellite based global positioning system (GPS) 14, a cellular telephone tower triangulation system 16, such as a GSM cell phone location system (CELLID), and a wireless access point identification system (WAPID) 18. CELLID and WAPID are terrestrial based systems. Other terrestrial location systems are also known, such as ultrasonic beacons, RFID beacons, or Bluetooth based (such as BLE) location systems.

Different devices handle location determination in different ways. For example in an Android™ based mobile telephone a software developer can access location services on the mobile telephone in a different way to that available on an iOS™ based mobile telephone. For this reason there may be some differences in the implementation of the present invention in each of these and other platforms.

Figure 3:
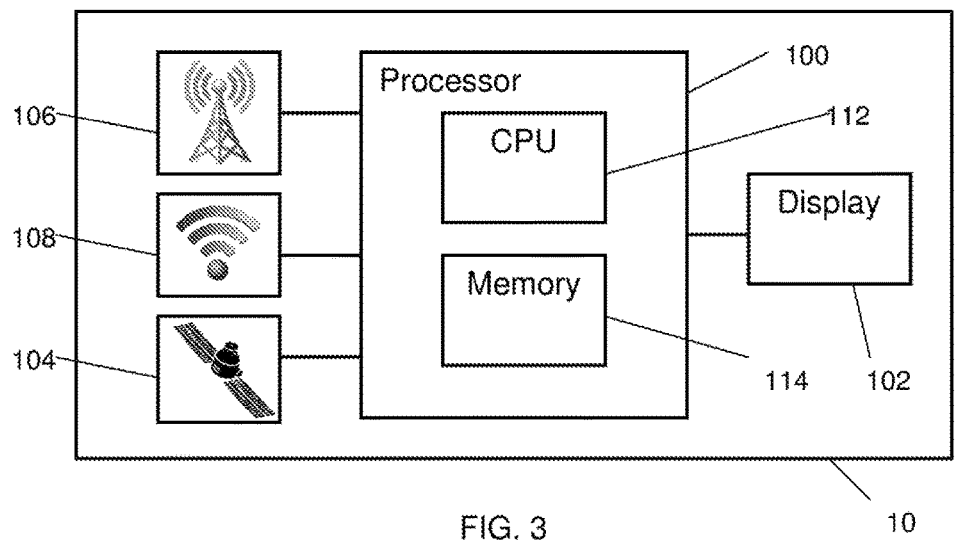
FIG. 3 is a schematic block diagram of mobile device according to an embodiment of the present invention.

Referring to FIG. 3 a mobile device 10 comprises a processor 100 which comprises at least one processor core 112 and memory 114. The memory 114 may comprise volatile memory, such as DRAM and non-volatile memory, such and flash memory. A computer program or programs will be stored in the non-volatile (non-transient) memory and may be temporarily moved to the volatile memory for execution. The volatile memory may also be used by the core 112 for temporary storage of data. Long term data storage is provided by the non-volatile memory.

The processor 100 controls a display 102 for providing visual information to a user. The processor also controls a GPS system module 104, a cellular telephone communication module 106 and a wireless network communication module 108. The cellular telephone communication module 106 and the wireless network communication module 108 may each have a location determining component or the processor may have a computer program that uses information from the cellular telephone communication module 106 and the wireless network communication module 108 to determine the location of the mobile device. In one embodiment the configuration of the processor 100 is provided by an operating system 200, shown in FIG. 4. In other embodiments some or all of the configuration of the processor 100 may be implemented in hardware, firmware or one or more computer modules or computer programs executed by the processor 100.

Figure 4:
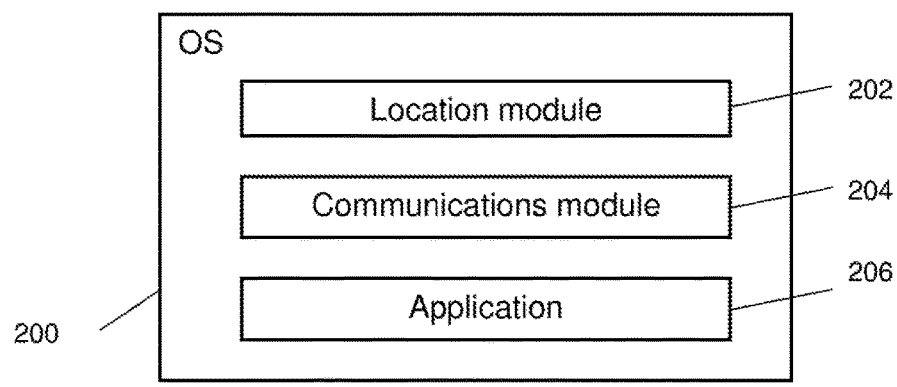
FIG. 4 is a schematic block diagram of functional modules of the mobile device according to an embodiment of the present invention.

Referring to FIG. 4, an operating system 200 is shown. The operating system controls the processor 100 and comprises function specific modules 202 and 204. The operating system controls access that application computer programs 206 have to the processor 100. In an embodiment the operating system 200 maybe an Android™ operating system, an iOS™ operating system, Windows Phone™ operating system, Blackberry™ operating system or another suitable operating system. In this embodiment the operating system 200 comprises a location module 202 that accesses the modules 104, 106 and 108, and from this is able to generate a determined location of the mobile device from one or more of these systems. Such a module is available in version 6 of iOS and in the Jelly Bean version of the Android operating system.

In this embodiment the operating system (OS) 200 comprises a communications module 204 that accesses the modules 106 and 108 to establish a network connection, such as a connection to the internet, via the cellular data network (in the case of 106) and via a wireless network to an internet gateway (in the case of 108). Such a module is available in version 6 of iOS and in the Jelly Bean version of the Android operating system. The implementations may vary between different operating systems, and indeed between different versions of operating systems, depending on what the operating system allows.

In this embodiment an application 206 in the form of a computer program (as described above) interacts with the location module 202 and the communications module 204 to use these modules, the OS 200 and the devices of the mobile device 10 to perform an aspect of some embodiments of the invention. In particular the computer program controls the functional modules to configure the mobile device according to an embodiment of the invention and to control the mobile device to perform a method of an embodiment of the invention.

Figure 2:
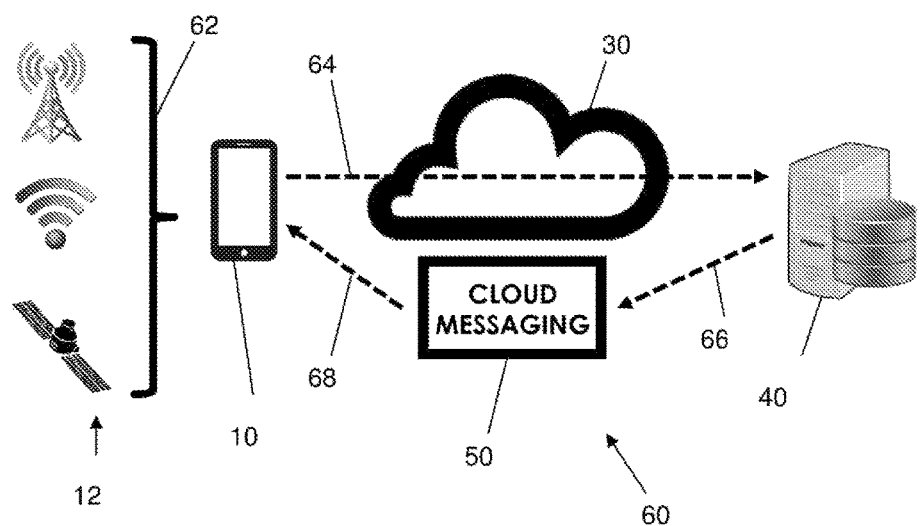
FIG. 2 is a the schematic block diagram of system for determining the location of a mobile device according to an embodiment of the present invention.

Referring to FIG. 2 a mobile device 10 comprises part of a system 60 according to another aspect of the invention. In this embodiment the system 60 further comprises a network connection 30, such as the Internet, a remote system 40 and a messaging system 50. The remote system 40 will typically be a server servicing a plurality of mobile devices, however for simplicity's sake the invention will be described with reference to one mobile device, although it will be understood that the system is capable of working with many mobile devices when suitably configured.

In example embodiments, the server 40 is a computer system configured by one or more computer programs stored on tangible non transient media, such as a hard disk drive, flash memory, CD, DVD etc., so as to be configured as described and so as to perform the method as described. The computer system may constitute a "module" that is configured and operates to perform certain operations. In other embodiments, the "module" may be implemented mechanically or electronically. A module may comprise dedicated circuitry or logic that is permanently configured (such as within a special-purpose processor) to perform operations as described. A module may also comprise programmable logic or circuitry (e.g. as encompassed within a general-purpose processor or other programmable processor) that is configured by one or more computer programs (firmware, operating system and or software) to perform as controlled by the computer programs so as to be configured to perform as described. The decision to implement a platform or module according to these options may be made according to cost, expediency or other reasons. Accordingly, the term "module" should be understood to encompass a tangible element that is physically constructed and configured to operate in a certain manner and/or to perform certain operations as described.

The server 40 is connected to the communication network 30 and to the messaging system 50. The messaging system 50 is typically a cloud messaging system which allows messages to be sent to a specific mobile device, where the mobile device 10 is able to monitor for the message using a background service. An example cloud messaging system 50 is the Google Cloud Messaging system which allows data to be send from a remote system (such as system 40) to an Android application on an Android device (such as mobile device 40). Another example cloud messaging system 50 is the Apple Push Notification Service that allows notifications from a server (such as system 40) to be sent to an application running on an iOS device (such as mobile device 40).

In an embodiment the mobile device 10 uses location determining module 202 to determine the location of the device 10 according to one or more of the location systems 12. This involves receiving a signal 62 from one or more of the systems 12 and interpreting that signal to determine a location. The location is generally provided in a latitude and longitude set of coordinates, although other formats may be employed. Also an accuracy of the location is typically calculated based on signal strength, number of fixes on towers/satellites etc and is usually given as the accuracy radius 20.

The mobile device 10 then establishes a connection between it and the server 40 over the network 30 and transmits a message 64 typically comprising the determined location to the remove system. The message 64 further includes accuracy measure 20 and may also include a speed and direction measure. The connection is typically terminated once the message is sent.

Optimised transfer protocols are in used in message 64 in order to minimise bandwidth consumption: the mobile device uses a simple data interchange structure, such as JSON format and asynchronous binary web protocols to transfer data.

The server 40 then uses the determined location according to a particular application. Generally this will be to determine whether the mobile device 10 is at a particular location of interest, or within an area of interest defined by a so-called "geofence". This may trigger a message to the mobile device 10 as will be described further below.

In an embodiment, irrespective of whether the mobile device 10 is at a particular location a message 66 is sent by the server 40 to the messaging system 50 for on forwarding as message 68 to the mobile device 10. This message 66/68 (hereafter simply referred to as message 68) comprises a datum representing a type of location determining method to be used next time and in an embodiment a datum representing a period of time to wait before determining the location again.

The server 40 determines the next type of location method and in an embodiment determines the period of time for waiting, without determining the location of the mobile device 10 before again determining the location of the mobile device 10. In some operating systems the degree of control permitted will be limited. In some embodiments the time will be determined by the mobile device 10.

The mobile device 10 will wait the determined period of time before again determining the location of the mobile device 10 using the selected location determining method for repeating the process. This process repeats on an on going basis.

In an operating system like Android™, Windows 8™, Blackberry OS™, a developer may have control of a background service which is part of the application 206. In an embodiment where the mobile device 10 has Android™ or a similar operating system 200, the mobile device 10 and server 40 may be configured as follows.

The message 68 from the server 40 comprises a time period datum that represents the determined time period before again determining the location of the mobile device 10. The time period before again determining the location of the mobile device 10 is determined by the server according to a set of criteria.

In an embodiment the location determining module 104, 106 and 108 is selectable. In an embodiment the message 68 comprises a datum indicative a selected type of location determining module to be next used to determine the location. In an embodiment the selected location determining module is activated after the wait period in the next location determination. The activated location determining module is deactivated after a second period of time. The second time period is based on factors determined by the mobile device 10.

In an embodiment the second time period is based on a location determining time calculated by the server 40, wherein the server 40 sends a datum indicative of the location determining time in message 68.

In an embodiment the background service in the mobile device 10 causes activation of the selected location determining module at the end of the wait period and deactivates the location determining module at the end of the location determining time period.

Where the operating system 200 is iOS6™ or similar, the mobile device 10 may have a location module 202 running in the background, in which the module 202 may receive updates to a geographic region and the module 202 informs the application 206 when the mobile device 10 crosses a boundary of the geographic region. To do so, the device automatically updates its location using terrestrial providers only in order to save battery life, but accuracy can be poor. Once device enters a region of interest, the application 206 can be started. The application 206 can selectively get the location using a timer and GPS module 104 for good accuracy when necessary. Use of GPS stops when user exits the region or movement speed of the device 10 is too low or battery level is too low. The mobile device 10 and server 40 may be configured as follows.

In an embodiment the time period before again determining the location of the mobile device is determined by the mobile device 10 according to a set of criteria.

In an embodiment the location determining module 104, 106, 108 used to determine the location is selectable. In an embodiment the mobile device 10 selects the type of location determining module to be used to determine the location. In an embodiment the location is next determined after the wait period.

In an embodiment a background service that is part of the location module 202 in the mobile device 10 causes activation of the selected location determining module at the end of the wait period and deactivates the location determining module at the end of the location determining time period.

Referring to FIG. 2, the message 68 comprises a time period datum that represents the determined time period before again determining the location of the mobile device.

In an embodiment the message 64 may also include an indication of the battery level of the mobile device 10.

In an embodiment the period of time before again determining the location of the mobile device is determined according to the location of the mobile device 10 relative to a location of interest, the accuracy of the determined location, the speed and direction of travel of the mobile device 10, the battery level of the mobile device 10, the time of day, whether a location aware application is open (in the foreground) or running in the background, or the location module determining that the mobile device 10 has crossed a boundary of a region. Other parameters may also be used.

The mobile device 10 may override the time period from the server 40, according to a user setting or if the battery level of the mobile device 10 drops below a predetermined level, such as for example 10% of capacity.

Figure 7:
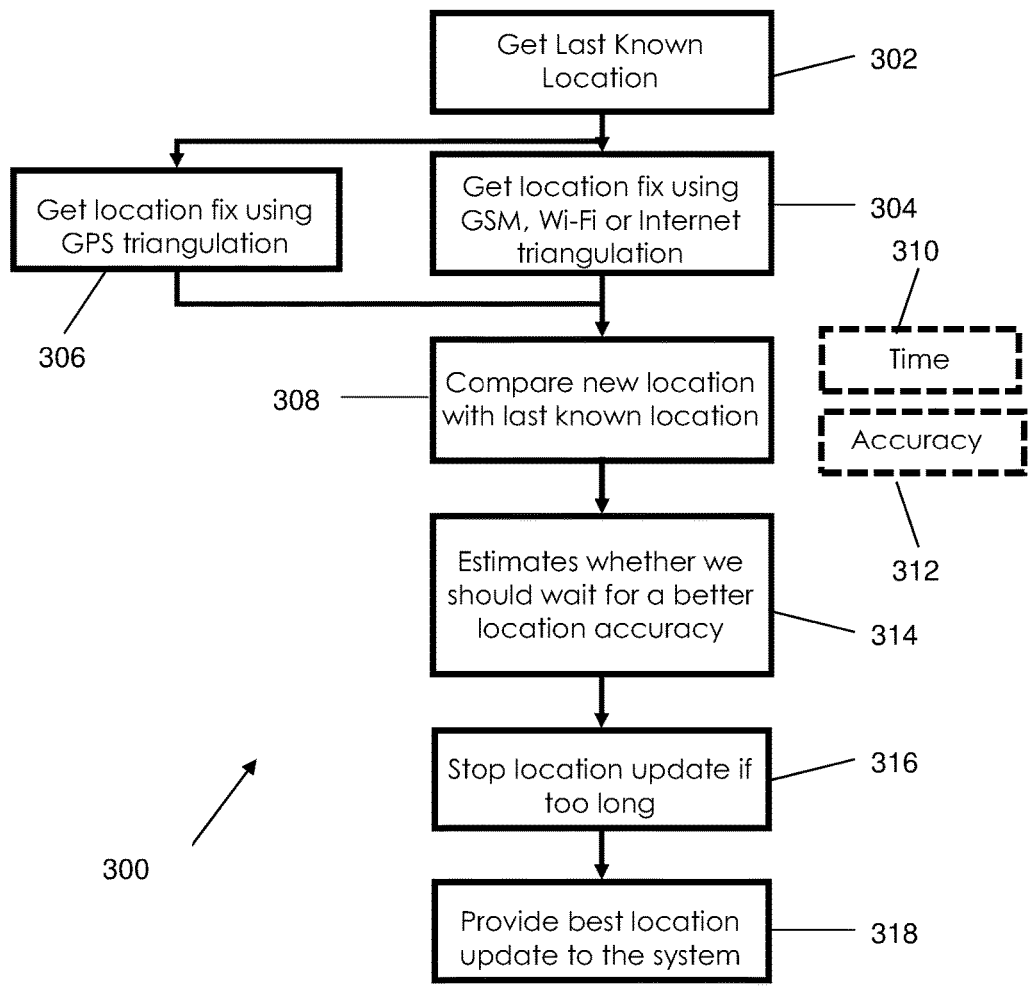
FIG. 7 is a schematic flow chart of a portion of a method of determining a location of a mobile device according to an embodiment of the present invention.

Referring to FIG. 7, there is a method for determining the location of the mobile device. At 302 the last known location is retrieved from storage. The mobile device 10 determines its location using either the satellite module 104 at 306 or using one of the terrestrial modules 106 or 108 at 304, according to the last selection. The new location is compared to the last known location at 308.

At 316, the time 310 of determining the location is also received, as is the accuracy 312 of the determined location. An estimation is performed at 314 as to whether the current location should be used or the previous location should be used. For example if the accuracy of the new location is not good enough and the last accuracy is good enough then the last determination may be more likely to be better then the new one. The time between location determinations may be taken into account. For example if the time is 10 s then the mobile device may not have move very far and the last determination will probably still be acceptable. If however the time has been 5 minutes, the mobile device may have moved far enough that the last determination may no longer be good enough. These time parameters may be adjusted for the speed at which the mobile device is moving at.

Once the best location has been decided it is provided, at 318, to a location aware application, such as a geofence alert generator.

The server 40 can adjust intervals between two location determinations according to the user's location, direction and speed.

In an embodiment the time period in which the location determining system is activated for is based on a location determining time calculated by the remote system, wherein the server 40 sends a datum indicative of the location determining time in the message 68.

Figure 5:
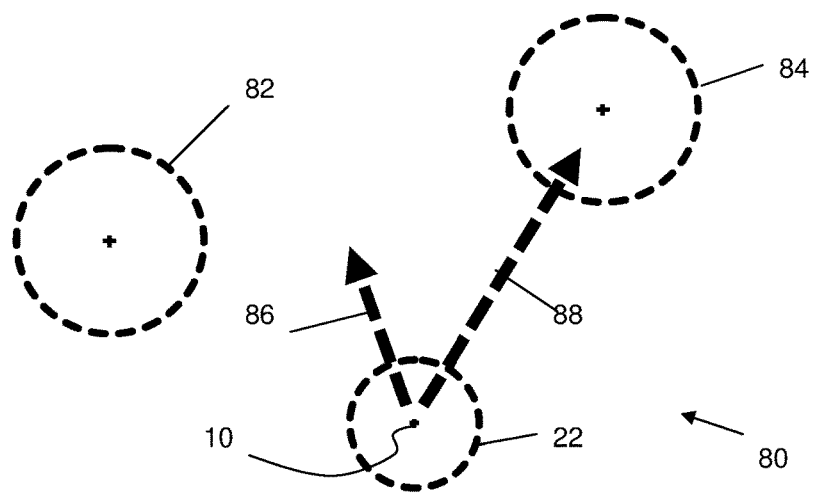
FIG. 5 is a schematic diagram showing a portion of a method of determining a location of a mobile device according to an embodiment of the present invention.

FIG. 5 shows a mobile device 10 moving at a low speed with no geofence nearby or ahead as indicated by 86. In this case the crossing a geofence boundary is not imminent and so the time period before next location determination is made can be increased. In an alternative example mobile device 10 is moving at a high speed with geofence ahead as indicated by 88. In this case or if the device 10 crosses a boundary of a region defined in device 10 then crossing the boarder of the geofence may be imminent and so the time period before the next location determination is made is decreased, thus increasing the frequency of checking the location. When the application 206 is not able to operate in the background then the application will start a timer and will proceed in the foreground using the method of the present invention.

Generally a terrestrial location determining module will be selected. However if greater accuracy is required then GPS may be used. Also in some cases a terrestrial location determining module will not return a location. Where this occurs, the GPS module is activated for a period of time.

Figure 6:
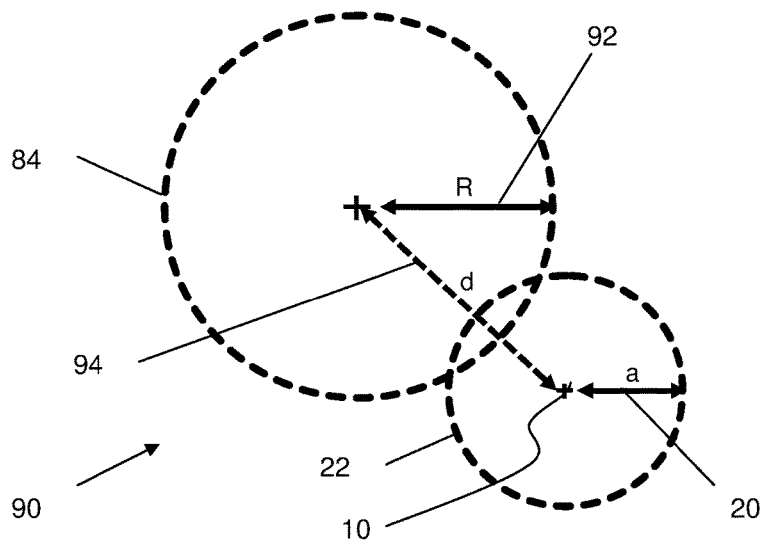
FIG. 6 is a schematic diagram showing a portion of a method of determining a location of a mobile device according to an embodiment of the present invention.

FIG. 6 shows an example of how a determination of entering a geofence is made by the server 40, taking into account the accuracy of the determined location. In the FIG. 84 is the boundary of the geofenced area. The radius R of the geofence is indicated by 92. The distance d (indicated by 94) is determined between the determined location of the mobile device 10 and the centre of the geofenced area 84. The accuracy a is indicated by 20. The server 40 will determine that the device is proximate to the geofence and will send the device 10 a proximity alert via cloud messaging 50 when d<=R and a<R. Otherwise the service 40 does not regard the mobile device 10 as crossing the boundary 84.

Figure 8:
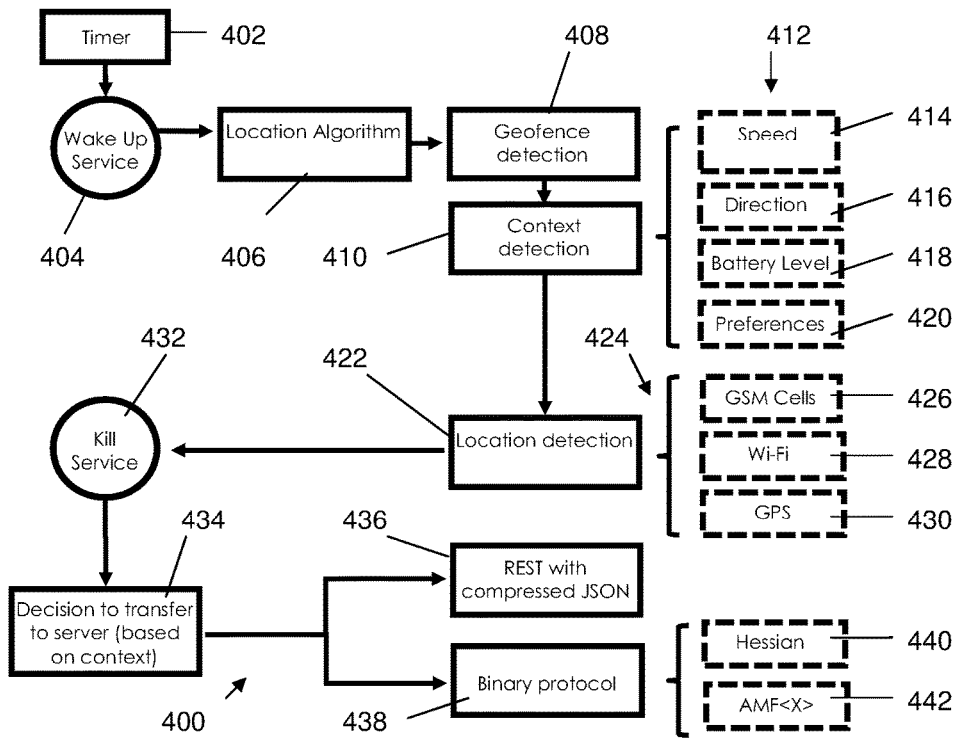
FIG. 8 is a schematic flow chart showing a portion of a method of determining a location of a mobile device according to an embodiment of the present invention.

Referring to FIG. 8, a method 400 performed by the mobile device 10 is shown. A background timer routine counts down the time period at 402. The timer routine uses minimal battery power. When the time is up is wakes 404 a foreground process which activates the selected location determining module at 406 only for the time needed to determining the location.

In some cases geofence detection 408 is performed by the mobile device 10. Geofence locations are stored in the device and retrieved using methods provided by native OS SDK. For example a boundary of 500 m may be established around a geofence and the foreground service is activated when the device 10 crosses this boundary.

Context detection occurs 410 taking account of parameters 412, including speed 414 of movement of the mobile device, direction 416 of movement of the mobile device, battery level 418 of the mobile device, and user preferences 420 set in the mobile device. Context detection can determine whether the user is moving at a walking speed. It may only be desired to trigger location alerts when the user is moving at walking speed.

Location detection occurs at 422 using one of the system 424, GSM cells 426, WiFi 428 or GPS 430 using the respective modules 106, 108 or 104 or other location detection modules such as from a short range wireless beacon, Bluetooth (BLE) etc. Usually GPS is used only when requested by the server 40 or in combination with native OS SDK. The location determine process is killed at 432 until the next time interval triggered by the background service timer. This keeps the location determination action time-boxed and will return the best last known location if an updated location fix is not available within the allowed period of time.

A decision is made at 434 to transfer the location to server 40 based on the detected context. For example the battery level may be too low, or it may be the middle of the night or the mobile device may not have moved for an hour. If the context is such that the location should be transferred to the server 40, the transfer occurs using, for example, representational state transfer (REST) with compressed JSON 436 or a binary web protocol such as Hessian or protocol buffers.

Figure 9:
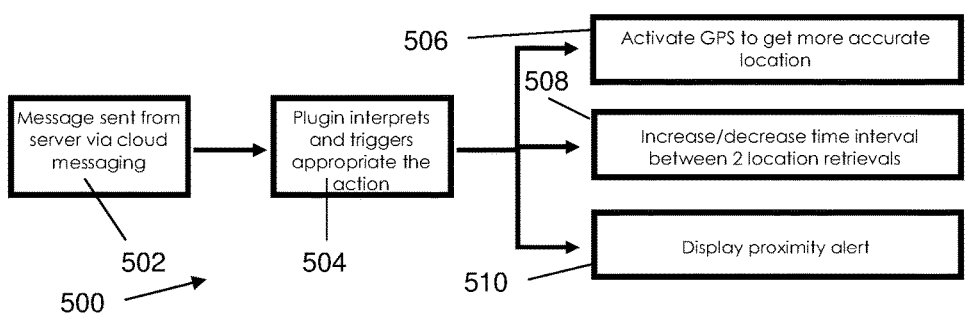
FIG. 9 is a schematic flow chart showing a portion of a method of determining a location of a mobile device according to an embodiment of the present invention.

FIG. 9 shows method 500 performed by the mobile device 10 when message 68 is received. The application 206 interprets and triggers appropriate action 504. According to the data received, it may activate the GPS 506 in order to get a more accurate location fix, increase or decrease the time interval before the next location determination 508 based on device context analysis, or display a proximity alert 510 (or perform another action in response to a 'geo-message'.

Communications between client/server are done via HTTP poll or cloud messaging according to the mobile platforms.

In an iOS6™ environment developers may define regions that trigger a specific action in the background when device 10 enters a specific region. Regions may be manually updated by the user when they receive a notification to do so. The synchronization with the server 40 is done only when the application is in foreground. Push notifications can be used to trigger the application 208 or the timer routine 402 thereof so data is refreshed by the time the application is opened.

Figure 10:
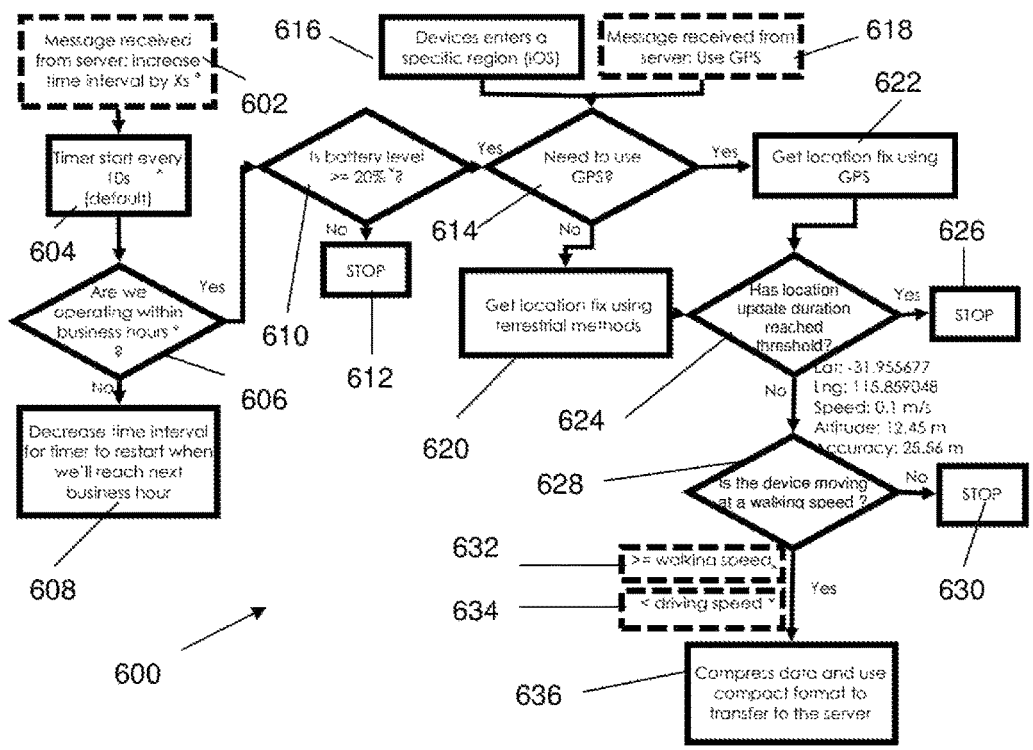
FIG. 10 is a schematic flow chart showing a portion of a method of determining a location of a mobile device according to an embodiment of the present invention.

FIG. 10 shows an embodiment of method 600 performed by the mobile device 10. A message is received from server 602, such as increase time interval by a time period, such as 10 s (or a new value, which is increased by the time period, such as 20 s where the last time period was 10 s). The time period need not be in multiples of 10 s.

At 604 the timer starts and with the check triggered ever time period, eg 10 s. At 606 a check is performed as to whether the current time of day is within defined period, such as operating hours of business. If not, the time interval before checking again is adjusted to restart when the time of day next reaches business hours at 608.

If the time of day is within business hours, at 610 there is a check performed of the battery level. Eg check if the battery level is above a parameter amount, eg 20%. If not stop 612 until the battery level is above 20%.

If there is enough charge left in the battery, then check at 614 whether the location module needed is GPS. In an iOS™ environment the device 10 checks whether it is within a defined region at 616 or if message received from server to use GPS 618. Otherwise if GPS not needed, at 620 the mobile device 10 gets its location using terrestrial modules. If using GPS, the device 10 gets its location using GPS at 622. At 624, check if a location update duration is reached. If yes, stop at 626. If no, obtain location information. Eg lat: −31.955677, long: 115.859048, speed: 0.1 m/s, altitude: 12.45 m, accuracy: 25.56 m Check at 628 if the device 10 is moving at a defined speed. If not, stop at 630. If the device 10 is moving at speed>=walking speed or <driving speed, compress 636 data and use compact format to transfer to server 40. These speeds are configurable and may be different. For example the configuration may be such that a location fix is obtained for cyclists or drivers only according to a user selected parameter.

Server 40 periodically receives information from the device background service such as location coordinates, accuracy, speed, altitude and direction then determines the following whether:

the device has entered or exited a geofence
the device is close to a geofence

The server should update the location interval based on the context of the device.

Figure 11:
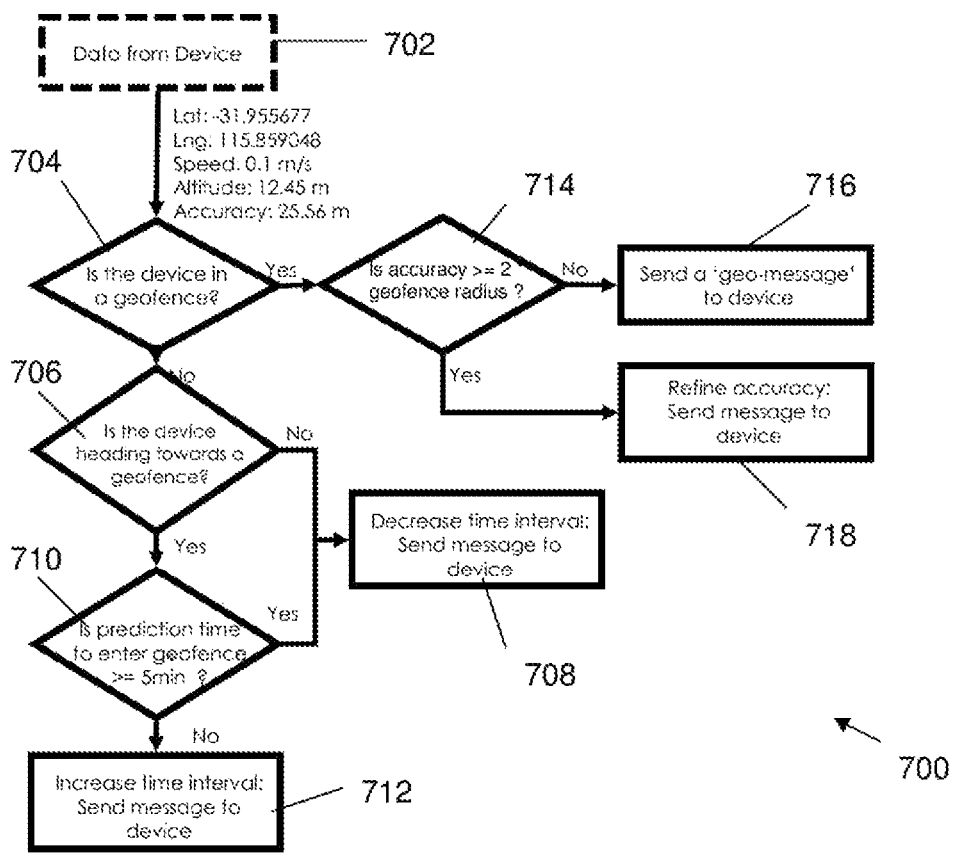
FIG. 11 is a schematic flow chart showing a portion of a method of determining a location of a mobile device according to an embodiment of the present invention.

Referring to FIG. 11 a method 700 performed by the server 40 is shown. At 702 the server 40 receives message 64 from mobile device 10. At 704 a check is performed to determine whether the device 10 is in geofence as described above with reference to FIG. 6. If not, check 710 if the device 10 is heading towards geofence as represented by arrows 86 and 88. If not (arrow 86), at 708 increase time before next location determination, and send message 68 to the device 10. If heading towards geofence (arrow 88), at 710 check if the predicted time to enter is greater than or equal to a parameter, eg 5 minutes. If so, at 708 decrease the time before the next location determination, and send a message 68 to the device 10.

If the time to the geofence is <5 min increase the time interval at 712 and send a message 68 to the device 10. This time is configurable.

If inside of a geofence, check if the accuracy of the determined location is greater than or equal to a factor of geofence radius (eg accuracy>2× radius). If not, then send 716 a geo-message (ie. a message indicating that the device is inside a geofence), such as a push notification, including a geofence alert, to device 10. If not accurate enough, have the device refine accuracy (by using GPS), and send 718 message to device 10.

The present invention provides an advantage in that it is suitable for sustained location detection and may use less data bandwidth. A geo-message can be used in many ways according to the needs of the application developer. For example geo-messages may trigger an alert or notification, a reminder, play a video, launch a website, a contactless payment, send a request to a server etc. For example: each time a VIP enters a restaurant, the staff management can receive an alert on their wearable device or on their own phone and welcome the VIP. The geo-message may be sent to a connected device or another mobile device. In another example each time a user comes within 5 minutes from their home, the heater automatically switches on. In another example digital displays in a shopping mall can display an advertisement to a shopper whenever they move close to the digital display, and the advertisement can change according to context information specific to the shopper.

Modifications may be made to the present invention within the context of that described and shown in the drawings. Such modifications are intended to form part of the invention described in this specification.

The invention claimed is:

1. A method of determining a location of a mobile device having both a module that is part of a terrestrial-based location system and a module that is part of a satellite-based global positioning system, said method comprising:

(i) determining the location of the mobile device using one or more of the location determining modules;
(ii) establishing a connection between the mobile device and a remote system;
(iii) transmitting the determined location to the remote system over the established connection;
(iv) determining a period of time for waiting before again determining the location of the mobile device;
(v) receiving a message from the remote system via a messaging service, the message comprising a time period datum that represents the determined time period before again determining the location of the mobile device;
(vi) waiting the determined period of time; and
(vii) determining the location of the mobile device after the waited period of time has elapsed.

2. A method according to claim 1, wherein the messaging service is independent from the connection established between the mobile device and the remote system.

3. A method according to claim 1, wherein the messaging service operates whether or not the connection established between the mobile device and the remote system is established.

4. A method according to claim 1, wherein the messaging service operates after the connection established between the mobile device and the remote system has been terminated.

5. A method according to claim 1, wherein the time period before again determining the location of the mobile device by use of the terrestrial-based location system is determined by the remote system according to a set of criteria.

6. A method according to claim 5, wherein the criteria for determining the time period before again determining the location of the mobile device comprise one or more of the following:

i) Use a longer time period when the battery level of the mobile device is below a first specified amount;
ii) Use a longer time period when the accuracy of the last determination is better than a fourth specified amount;
iii) The time period may be varied according to altitude of the mobile device;
iv) Use a longer time period when a location sensitive application is running in the background of the mobile device.

7. A method according to claim 5, wherein the criteria for determining the time period before again determining the location of the mobile device comprise: use a longer time period when the time of day is within a specified period; and use a shorter time period when the time of day is outside the specified period.

8. A method according to claim 5, wherein the criteria for determining the time period before again determining the location of the mobile device comprise: use a longer time period when the mobile device has a speed of movement less than a second specified amount; use a longer time period when the mobile device has a speed of movement more than a third specified amount; and use a shorter time period when the mobile device has a speed of movement between the second specified amount and the third specified amount.

9. A method according to claim 5, wherein the criteria for determining the time period before again determining the location of the mobile device comprise: use a longer time period when the accuracy of the last determination is better than a fourth specified amount; use a shorter time period when the accuracy of the last determination is worse than a fifth specified amount.

10. A method according to claim 1, wherein the or each used location determining module calculates an accuracy value of the determined location, the transmission to the remote system includes the accuracy value, and the accuracy value is used by the remote system to determine the time period before again determining the location.

11. A method according to claim 1, wherein the transmission to the remote system includes an indication of the speed and direction of movement of the mobile device, and the speed and direction of movement are used by the remote system to determine the time period before again determining the location.

12. A method according to claim 1, wherein the location determining module to be next used to determine the location is selectable and wherein the message received from the remote system comprises a datum indicative of a selected type of location determining module to be next used to determine the location.

13. A method according to claim 12, wherein the selected type of location determining module is selected according to the accuracy of the last location determination.

14. A method according to claim 12, wherein the selected type of location determining module is selected according to a distance the mobile device is from entering a geofence.

15. A method according to claim 12, wherein the selected type of location determining module is selected according to the size of a nearby geofence.

16. A method according to claim 1, wherein the location determining modules are deactivated after a second period of time has elapsed from the time at which the location determination module is activated.

17. A method according to claim 16, wherein the second time period is a predetermined value according to the type of activated location determining module.

18. A method according to claim 16, wherein the second time period is based on a location determining time calculated by the remote system, wherein the remote system sends a datum indicative of the location determining time in the received message from the remote system.

19. A method according to claim 1, wherein a background service in the mobile device causes activation of the location determining module at the end of the wait period and deactivates the location determining module at the end of the location determining time period.

20. A method according to claim 1, wherein in the case that the selected location determining module is a terrestrial location determining module and it is unable to determine the location of the mobile device within the second time period, the satellite-based location determining module is activated, the location of the mobile device is determined using the satellite-based location determining module; and the satellite-based location determining module is deactivated after a further time period.

21. A method according to claim 1, wherein the method further comprise comparing the most recently received location with a previously received location and determining whether to accept the most recently received location.

22. A computer program comprising computer executable instructions stored in a non-transitory medium for controlling a processor of a mobile device to perform the method defined in claim 1.

23. A method of determining a location of a mobile device having both a module that is part of a terrestrial-based location system and a module that is part of a satellite-based global positioning system, said method comprising:
 (i) establishing a connection between the mobile device and a remote system;
 (ii) receiving a determined location from the mobile device over the established connection;
 (iii) determining a type of location determining module to be used by the mobile device in the further location determination;
 (iv) sending a message from the remote system to the mobile device the message comprising a location module type datum representing the determined type of location determining module to be next used by the mobile device.

24. A system configured to determine a location of a mobile device having both a module that is part of a terrestrial-based location system and a module that is part of a satellite-based global positioning system, said system comprising:
 a processor for fetching the location of the mobile device using one or more of the location determining modules;
 a data transceiver for establishing a connection between the mobile device and a remote system and transmitting the determined location to the remote system over the established connection, the data transceiver being configured to terminate the connection when the transmission is sent;
 a processor for determining a period of time for waiting before again determining the location of the mobile device, wherein the data transceiver is configured to receive a message from the remote system via a messaging service, the message comprising a time period datum that represents the determined time period before again determining the location of the mobile device; and
 a timer for signalling when the determined period of time has elapsed;
 wherein one or more of the modules is configured to determine the location of the mobile device after the waited period of time is signalled to have elapsed.

25. A system according to claim 24, wherein the remote system is wherein the data transceiver is configured to receive from the remote system a datum indicative a selected type of location determining module to be next used to determine the location.

26. A system according to claim 24, wherein the data transceiver is configured to include an accuracy value of the determined location in the transmission to the remote system and the processor is configured to use the accuracy value to determine the time period before again determining the location.

27. A system according to claim 24, wherein the data transceiver is configured to include an indication of the speed and direction of movement of the mobile device in the transmission to the remote system and the processor is configured to use the speed and direction of movement to determine the time period before again determining the location.

28. A system according to claim 24, wherein the processor for determining a period of time is configured to increase the waiting period of time before again determining the location of the mobile device according to one or more parameters.

29. A system according to claim 24, wherein the messaging service is configured to operate whether or not the connection established between the mobile device and the remote system is established.

30. A system of determining a location of a mobile device having both a module that is part of a terrestrial-based location system and a module that is part of a satellite-based global positioning system, said system comprising:
 a remote system;
 a processor in the mobile device for activating one of the location determining modules of the mobile device, where the type of either location determining module activated is selected according to a location module type datum in a message received by the mobile device from the remote system;

a transmitter in the mobile device for establishing a connection between the mobile device and a remote system;

a receiver in the remote system for receiving the determined location to the remote system over the established connection;

a processor for determining a type of location determining module to be used by the mobile device in the further location determination;

a receiver in the mobile device receiving a message from the remote system, the message comprising a location module type datum representing the determined type of location determining module to be next used by the mobile device.

31. A method of determining a location of a mobile device having both a module that is part of a terrestrial-based location system and a module that is part of a satellite-based global positioning system, said method comprising:
(i) establishing a connection between the mobile device and a remote system;
(ii) receiving a determined location from the mobile device over the established connection;
(iii) determining the proximity of the mobile device to a predefined set of boundaries;
(iv) determining a type of location determining module to be used by the mobile device in further location determination;
(v) sending a message from the remote system to the mobile device, the message comprising a location module type datum representing the determined type of location determining module to be next used by the mobile device.

32. A system configured to determine a location of a mobile device having both a module that is part of a terrestrial-based location system and a module that is part of a satellite-based global positioning system, said system comprising:
a data transceiver for receiving a connection between the mobile device and the system and receiving across the connection a location of the mobile device as determined by one or more of the location determining modules to the remote system over the established connection;
a processor for determining a period of time for waiting before again determining the location of the mobile device, and for constructing a message to the mobile device;
wherein the data transceiver is configured to send the message from the remote system via a messaging service to the mobile device,
wherein the message comprises a time period datum that represents the determined time period before again determining the location of the mobile device such that the mobile device is able to use one or more of the modules to determine the location of the mobile device after the period of time has elapsed.

33. A system according to claim 32, wherein the processor is configured to determine a type of location determining module for the mobile device to next use when determining its location and the processor is configured to construct the message so as to comprise a module indicating datum that represents the determined location determining module that the mobile device such that the mobile device should use when next determining the location of the mobile device.

* * * * *